March 31, 1936.     E. N. HURLBURT     2,035,603

HYDROMETER

Filed March 23, 1935

INVENTOR
EDWARD N. HURLBURT
BY D. Clyde Jones
ATTORNEY

Patented Mar. 31, 1936

2,035,603

UNITED STATES PATENT OFFICE 2,035,603

HYDROMETER

Edward N. Hurlburt, Rochester, N. Y., assignor to Taylor Instrument Companies, Rochester, N. Y., a corporation of New York Application March 23, 1935, Serial No. 12,667

2 Claims. (Cl. 265—45)

This invention relates to measuring instruments of the float type, and more particularly to hydrometers.

It is essential that the graduated scale of a hydrometer be located within the stem thereof, and for this reason it has been customary to fasten the scale adhesively within this stem. However, the adhesive frequently deteriorates and permits the graduated scale to slip from its proper position, with the result that the readings of the hydrometer are inaccurate.

In accordance with the present invention, it is proposed to fasten the graduated scale of a hydrometer in the ballast which, in turn, is anchored in the lower end of the hydrometer float body.

Figure 1:
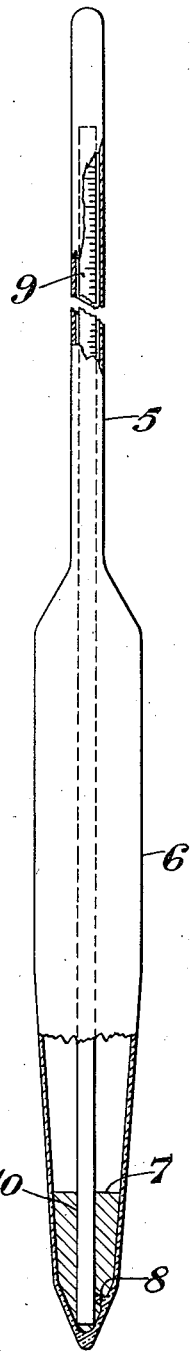
Figure 2:
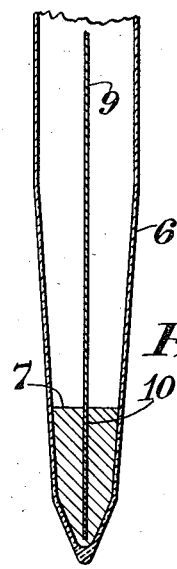

For a clearer understanding of the invention reference is made to the drawing in which Fig. 1 is a front elevation with parts thereof broken away, illustrating a hydrometer incorporating the present invention; and Fig. 2 is a fragmentary vertical sectional view taken at right angles to the principal plane of the scale strip.

In Fig. 1, 5 designates the hollow glass stem of a hydrometer provided at its lower end with a hollow glass float body 6. In the lower end of the float body there is anchored suitable ballast material 7, which is preferably a fusible alloy. As herein shown the ballast is anchored in the lower end of the float body by means of a glass lug 8 projecting from the inner wall of the body into the ballast. A graduated scale strip 9, preferably of light metal such as aluminum, has its lower end fused or otherwise anchored, as indicated at 10, in the ballast 7. This strip at its lower end may engage the inner surface of the lower end of the float body and extends upwardly into the stem 5. The upper portion of the strip within the stem is suitably graduated in accordance with any desired scale.

In making the hydrometer, the glass float 6 having the glass lug 8 projecting from its inner wall and having the glass stem 5 extending from its upper end is fabricated in any well-known manner. At this stage the upper end of the stem is left open so that the proper amount of ballast in the form of fusible metal pellets can be introduced therethrough into the float. The strip 9, which has been graduated in accordance with the usual practice, is then inserted into the hydrometer in the position shown in Fig. 1. Some of the pellets of fusible metal may be added or removed from the float so that the device reads properly. Then the metal pellets are fused by immersing the lower end of the float body in a heated bath and after the fused metal solidifies, the upper end of the stem is sealed as shown. When the fused metal solidifies, it is anchored by the lug 8 to the inner wall of the float and this metal anchors the lower end of the scale strip so that there is no danger of this strip slipping. By this construction the hydrometer remains accurate throughout its life.

I claim:

1. In a device of the class described, a glass float body communicating with a hollow glass stem, fusible ballast material anchored in the lower end of said float body, and a scale element having a portion thereof permanently gripped by said material and having a graduated portion extending into said stem.

2. In a device of the class described, a glass float body having one closed end and an open end, a hollow glass stem connected to and communicating with said float body at the open end thereof, fusible ballast material anchored in the closed end of said float body, and a metal scale strip having a graduated portion extending into said stem and having another portion thereof fusibly connected to said ballast material.

EDWARD N. HURLBURT.